Patented June 10, 1924.

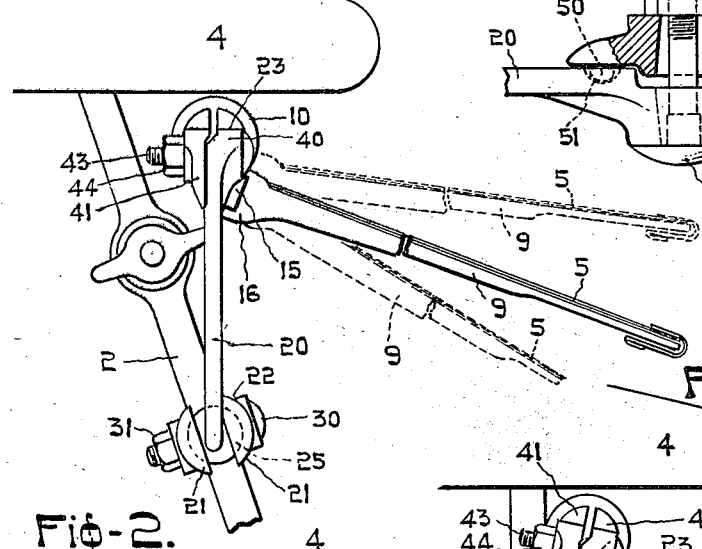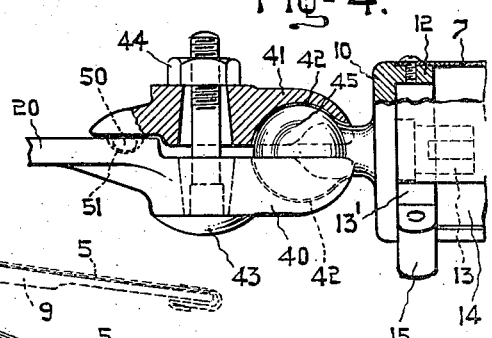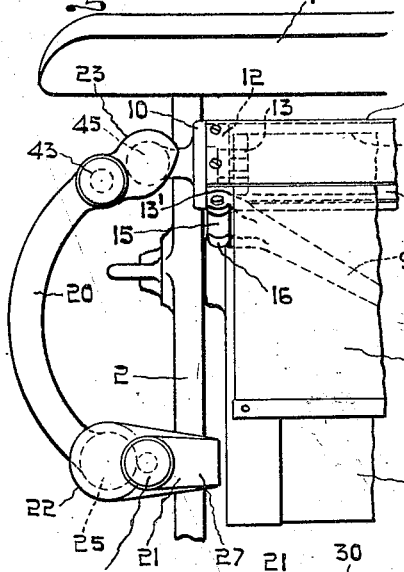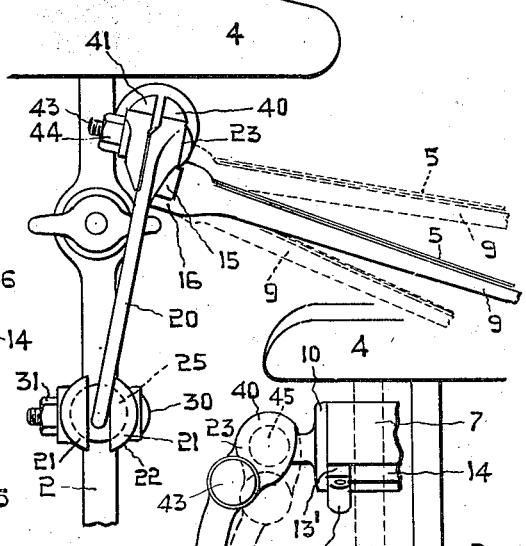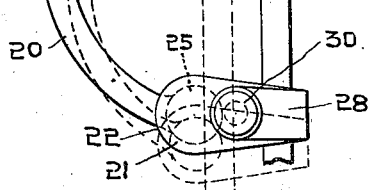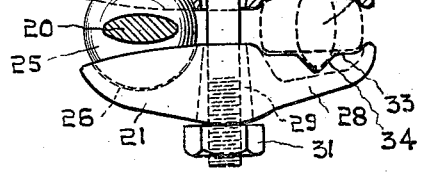

1,496,997

UNITED STATES PATENT OFFICE.

JOSEPH PRESNER AND JOHN HALLIDAY, OF MONTREAL, QUEBEC, CANADA, ASSIGNORS TO THE V. P. AUTO APPLIANCE COMPANY LIMITED, OF MONTREAL, QUEBEC, CANADA.

WINDSHIELD ATTACHMENT.

Application filed October 31, 1921. Serial No. 511,962.

*To all whom it may concern:*

Be it known that we, JOSEPH PRESNER and JOHN HALLIDAY, subjects of the King of Great Britain, and residents of the city of Montreal, Province of Quebec, Canada, have invented certain new and useful Improvements in Windshield Attachments; and we do hereby declare that the following is a full, clear, and exact description thereof.

Our invention relates particularly to means for mounting a storm and sun shield of the type illustrated in our patent application filed July 14, 1921, now Patent No. 1,426,793 upon the windshield of an automobile.

The object of the invention is to provide a mount which owing to its universal adjustability will enable the mounting of the storm and sun shield upon wind shields of all recognized types whether vertical or inclined regardless of their size.

Another object of the invention is to permit of easy adjustment of the angle of inclination of the storm and sun shield relatively to the windshield.

Further objects are to provide a connection between the storm and sun shield and windshield which will not interfere with movement of any of the parts of the latter, which will be decorative, durable and efficient and which can be manufactured at relatively low cost.

For full comprehension however of our invention, reference must be had to the accompanying drawings in which similar reference characters indicate the same parts, and wherein:

Figure 1 is a fragmentary side elevation of an inclined automobile windshield equipped with our invention;

Figure 2 is a fragmentary front elevation thereof;

Figure 3 is a part elevation and part sectional view of the clamp for connection to the windshield;

Figure 4 is a similar view to Figure 3 of the connection between our improved mount and the storm and sun shield;

Figure 5 is a similar view to Figure 1 showing the mount applied to a vertical windshield; and Figure 6 is a similar view to Figure 2 illustrating the possibilities of adjustment.

Referring to the drawings the windshield post of an automobile is indicated at 2 upper glass windshield panel at 3 and top of the automobile at 4. The windshield illustrated in Figure 1 is of the inclined type while that illustrated in Figure 5 is of the vertical type, these two types being shown to indicate the wide application of a storm and sun shield provided with our invention.

The storm and sun shield is indicated at 5 and is constructed and arranged to be wound upon a roller 6 which is rotatably mounted within a cylindrical casing 7, the shield being adapted to be projected forwardly by arms located at each end thereof. One of these arms is indicated at 9. Springs which impart to the arms a tendency to swing forwardly are not shown as they form no part of the present invention.

Each end of the casing is closed by a unitary member 10 having a circumferential flange 12 for connection to the casing 7 and an inwardly extending hub 13 in which one end of the roller is journalled. The flange 12 on each of the closures 10 is provided with an opening 13' registering with the longitudinal opening 14 in the casing through which the shield is projected, and at the lower side of the first mentioned opening such flange has a lug 15 formed thereon. Each of these lugs hingedly carries the forked end 16 of one of the arms 9.

Our improved supporting means for mounting the storm and sun shield upon the windshield consists of universally adjustable brackets supporting the casing 7 at its opposite ends and adapted to be detachably secured to the windshield posts 2. These brackets are constructed alike in all respects with the exception that one is designed for application to the right of the windshield and the other to the left.

Each consists of an arm 20 preferably curved, a clamp, 21, a universal connection 22 between the lower end of the arm and the clamp 21, and a universal connection 23 between the upper end of the arm and the adjacent end of the casing 7. The universal connections 22 and 23 are constituted by ball and socket joints and it is immaterial how the ball and socket is arranged that is to say instead of the lower end of the arm 20 terminating in the ball 25 seated in a socket 26 in clamp 21 as illustrated in the drawings such arrangement may be reversed and the arm provided with the socket and the clamp with the ball. The same also applies to the ball and socket joint at the upper end of the arm. The clamp 21 consists of a pair of jaws 27 and 28 each having an opening 29 at its middle in alignment with the corresponding opening in the other jaw and these aligned openings accommodate a bolt 30 having a nut 31 which when tightened causes the jaws to move toward each other and respectively grip the windshield post and the ball 25 rendering the latter immovable in its socket. In order to secure a firm grip on the windshield post the jaws are provided with a second socket 32 on the opposite side to that containing the socket 26 and such socket is provided with two pairs of gripping faces 33 and 34 one pair of faces being designed to grip a windshield post of substantially rectangular or horseshoe cross-section and the other pair being designed to grip a post of elliptical or circular cross-section. The openings 29 are sufficiently large to permit of movement of the jaws relatively to the bolt so that when the latter is tightened a uniform grip will be secured upon the windshield post and the ball.

When it is desired to adjust the angle of the arm 20 relatively to the post to which it is secured the nut 31 is loosened and the arm is then free to be swung in any direction the ball 25 turning freely in its socket 26. When the adjustment has been secured the nut is tightened. The ball and socket connection at the upper end of the arm in the embodiment illustrated is constituted by a pair of jaws 40 and 41 presenting a socket 42 between them the first mentioned jaw being formed integrally with the arm and the second jaw being secured thereto by a bolt 43 having a nut 44, the nut when tightened being adapted to cause the jaws to grip the ball 45 which is seated in the socket 42. This ball is formed integrally with the closure 10 on the adjacent end of the casing 7 and constitutes a trunnion-like extension thereof so that by turning the ball in its socket the angle of inclination of the storm and sun shield may be varied. The jaw 41 is provided with a lug 50 and the jaw 40 with a socket 51 into which said lug projects for the purpose of preventing relative displacement between the jaws.

From the foregoing description it will be seen that a storm and sun shield equipped with these brackets may be readily applied to vertical and inclined windshields of different sizes without obstructing the movement of any of the windshield parts and the shield may also be swung to any angle.

In order to ensure a firm grip upon each ball of the universal connections when the parts are in adjusted positions the ball or its socket may be serrated.

What we claim is as follows:

1. The combination with an automobile windshield and a shield to be mounted thereon, of means for mounting each end of said shield upon the windshield, each of said means consisting of an arm and means for connecting the opposite ends of the arm to the adjacent end of the shield and windshield respectively, said means including ball and socket connections.

2. The combination with an automobile windshield and a shield to be mounted thereon, of means for mounting each end of said shield upon the windshield, said means consisting of an arm having a socket at one end and a ball at the opposite end, a clamp adapted to be secured to the windshield and having a socket adapted to receive said ball and permitting universal movement of the latter therein for purposes of adjustment, means for locking said ball against movement when adjusted, means for connection to one end of the said shield, said means including a second ball adapted to be mounted within the socket at the opposite end of the arm and capable of universal movement therein for purposes of adjustment, and means for locking said last mentioned ball against movement in its socket when adjusted.

3. The combination with an automobile windshield including the posts thereof and a storm and sun shield to be mounted thereon, of means for mounting the latter upon the former, said means consisting of a member having one end connected to said shield and having its opposite end terminating in a ball, and means for clamping said member upon the windshield, said means consisting of a pair of jaws movable to and from each other, a bolt uniting said jaws at their middle and adapted to move the jaws towards each other when tightened and sockets presented by said jaws on opposite sides of said bolt and adapted to receive and grip the ball on said member and one of the posts of the windshield, the jaws being capable of movement relatively to said bolt when the latter is being tightened to secure a uniform grip upon said ball and the windshield.

In testimony whereof we have signed our names to this specification in the presence of two witnesses.

JOSEPH PRESNER.
JOHN HALLIDAY.

Witnesses:
GORDON G. COOKE,
HARRIETTE McDONALD.